(12) United States Patent
Kane

(10) Patent No.: US 8,589,418 B1
(45) Date of Patent: Nov. 19, 2013

(54) SYSTEM FOR FACILITATING DISCOVERY AND MANAGEMENT OF FEEDS

(75) Inventor: Francis J. Kane, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 111 days.

(21) Appl. No.: 13/185,264

(22) Filed: Jul. 18, 2011

Related U.S. Application Data

(63) Continuation of application No. 11/966,816, filed on Dec. 28, 2007, now Pat. No. 7,984,056.

(51) Int. Cl.
*G06F 7/00* (2006.01)
*G06F 17/30* (2006.01)

(52) U.S. Cl.
USPC .......................................... 707/749; 707/767

(58) Field of Classification Search
None
See application file for complete search history.

(56) References Cited

U.S. PATENT DOCUMENTS

| | | | |
|---|---|---|---|
| 6,266,649 B1 | 7/2001 | Linden et al. | |
| 6,356,879 B2 | 3/2002 | Aggarwal et al. | |
| 6,374,237 B1 * | 4/2002 | Reese ................... | 1/1 |
| 6,484,149 B1 | 11/2002 | Jammes et al. | |
| 6,671,715 B1 | 12/2003 | Langseth et al. | |
| 6,865,546 B1 | 3/2005 | Song | |
| 6,912,505 B2 | 6/2005 | Linden et al. | |
| 6,963,850 B1 | 11/2005 | Bezos et al. | |
| 6,981,040 B1 | 12/2005 | Konig et al. | |
| 7,114,170 B2 | 9/2006 | Harris et al. | |
| 7,152,061 B2 | 12/2006 | Curtis et al. | |
| 7,310,612 B2 | 12/2007 | McQueen, III et al. | |
| 7,565,425 B2 | 7/2009 | Van Vleet et al. | |
| 7,590,562 B2 | 9/2009 | Stoppelman | |
| 7,620,697 B1 * | 11/2009 | Davies ........................ | 709/217 |
| 7,702,675 B1 * | 4/2010 | Khosla et al. ................. | 707/710 |
| 8,112,437 B1 * | 2/2012 | Katragadda et al. .......... | 707/769 |
| 8,150,878 B1 * | 4/2012 | Aizen et al. .................... | 707/791 |
| 2003/0126026 A1 | 7/2003 | Gronberg et al. | |
| 2004/0103186 A1 | 5/2004 | Casati et al. | |
| 2005/0038819 A1 | 2/2005 | Hicken et al. | |
| 2005/0132067 A1 * | 6/2005 | Bennett et al. ................ | 709/228 |
| 2005/0193010 A1 * | 9/2005 | DeShan et al. ............. | 707/104.1 |
| 2005/0267973 A1 * | 12/2005 | Carlson et al. ................ | 709/228 |
| 2006/0106665 A1 | 5/2006 | Kumar et al. | |
| 2006/0155698 A1 * | 7/2006 | Vayssiere .......................... | 707/6 |
| 2006/0167860 A1 * | 7/2006 | Eliashberg et al. ............... | 707/3 |
| 2006/0167973 A1 | 7/2006 | Ra et al. | |
| 2006/0206510 A1 | 9/2006 | Moulhaud et al. | |
| 2006/0230021 A1 * | 10/2006 | Diab et al. ........................ | 707/3 |

(Continued)

OTHER PUBLICATIONS

Client behavior and feed characteristics of RSS, a publish-subscribe system for web micronews, Liu et al, Internet Measurement Conference, pp. 29-34, 2005.*

(Continued)

*Primary Examiner* — Augustine K Obisesan
(74) *Attorney, Agent, or Firm* — Knobbe Martens Olson & Bear LLP

(57) ABSTRACT

A web feed portal can enable users to discover new web feeds and manage existing subscriptions of feeds. Recommended feeds can be generated for a user that reflect the user's interests or that are popular within a user community. Users can subscribe to feeds by selecting recommended web feeds or by contributing web feeds to the web feed portal. The user's web feed subscriptions can also be ranked to display the feeds in order of update time and/or time viewed by the user.

18 Claims, 5 Drawing Sheets

(56) References Cited

U.S. PATENT DOCUMENTS

| | | | |
|---|---|---|---|
| 2006/0259462 A1* | 11/2006 | Timmons | 707/3 |
| 2006/0265518 A1* | 11/2006 | Owens et al. | 709/246 |
| 2006/0288011 A1* | 12/2006 | Gandhi et al. | 707/10 |
| 2007/0005437 A1 | 1/2007 | Stoppelman | |
| 2007/0022174 A1* | 1/2007 | Issa | 709/217 |
| 2007/0043583 A1 | 2/2007 | Davulcu et al. | |
| 2007/0078884 A1* | 4/2007 | Ott et al. | 707/102 |
| 2007/0083520 A1 | 4/2007 | Shellen et al. | |
| 2007/0083536 A1* | 4/2007 | Darnell et al. | 707/101 |
| 2007/0083894 A1* | 4/2007 | Gonsalves et al. | 725/46 |
| 2007/0088832 A1* | 4/2007 | Tsang et al. | 709/227 |
| 2007/0094391 A1* | 4/2007 | Nussey | 709/225 |
| 2007/0100836 A1* | 5/2007 | Eichstaedt et al. | 707/10 |
| 2007/0100959 A1* | 5/2007 | Eichstaedt et al. | 709/217 |
| 2007/0203790 A1 | 8/2007 | Torrens et al. | |
| 2007/0225047 A1* | 9/2007 | Bakos | 455/566 |
| 2007/0250577 A1* | 10/2007 | Veeramachaneni et al. | 709/206 |
| 2007/0265857 A1* | 11/2007 | Shivaji Rao | 705/1 |
| 2008/0010294 A1* | 1/2008 | Norton et al. | 707/10 |
| 2008/0010337 A1* | 1/2008 | Hayes et al. | 709/202 |
| 2008/0021976 A1* | 1/2008 | Chen et al. | 709/217 |
| 2008/0034058 A1* | 2/2008 | Korman et al. | 709/217 |
| 2008/0066172 A1* | 3/2008 | Tarsi | 726/9 |
| 2008/0077574 A1 | 3/2008 | Gross | |
| 2008/0082941 A1 | 4/2008 | Goldberg et al. | |
| 2008/0086755 A1 | 4/2008 | Darnell et al. | |
| 2008/0104044 A1* | 5/2008 | Kardamilas et al. | 707/4 |
| 2008/0126476 A1 | 5/2008 | Nicholas et al. | |
| 2008/0140674 A1* | 6/2008 | Ishikawa | 707/10 |
| 2008/0147708 A1* | 6/2008 | Read et al. | 707/102 |
| 2008/0155112 A1* | 6/2008 | Ma et al. | 709/231 |
| 2008/0209351 A1 | 8/2008 | Macadaan et al. | |
| 2008/0222241 A1 | 9/2008 | Arvai et al. | |
| 2008/0240674 A1 | 10/2008 | Moore | |
| 2008/0281832 A1* | 11/2008 | Pulver et al. | 707/100 |

OTHER PUBLICATIONS

Cobra: Content-based filtering and aggregation of blogs and RSS feeds, Rose et al, 4th USENIX Symposium on Network System Design & Implementation, pp. 29-42, 2007.*

International Search Report and Written Opinion in PCT application PCT/US08/58516.

U.S. Appl. No. 10/864,288, filed Jun. 9, 2004.

U.S. Appl. No. 11/694,758, filed Mar. 30, 2007.

U.S. Appl. No. 12/605,297, filed Oct. 23, 2009.

U.S. Appl. No. 11/694,745, filed Mar. 30, 2007.

Press release titled "Aggregate Knowledge Delivers Relevance and Increases Revenue for Retail and Media Sites," dated Mar. 7, 2006.

Press release titled "Aggregate Knowledge Unveils the Internet's First Discovery Service," dated Jan. 30, 2007.

Ibrahim Cingil, et al., "A Broader Approach to Personalization," Communications of the ACM, vol. 43, No. 8, dated Aug. 2000, pp. 136-141.

Article titled "The Great Giveaway," by Erick Schonfeld, in Business 2.0 Magazine dated Apr. 1, 2005.

Blog posting titled "Loomia: a product-recommendation Web service," Alpha Blog, Alpha.cnet.com, dated Jul. 10, 2006, posted by Andrew Gruen, printed from http://reviews.cnet.com/4531-10921_7-6550327.html.

Schafer et al., "E-Commerce Recommendation Applications," Data Mining and Knowledge Discovery, vol. 5, Nos. 1-2, Jan. 2001, pp. 115-153.

Frankowsi, Dan; Shyong K. (Tony) Lam, Shilad Sen, F. Maxwell Harper, Scott Yilek, Michael Cassano, John Riedl. Recommenders Everywhere: The WikiLens Community-Maintained Recommender System. GroupLens Research, University of Minnesota, Oct. 21-23, 2007.

Co-owned Patent No. 7,881,984, issued Feb. 1, 2011. Filing receipt, specification, and drawings submitted.

\* cited by examiner

SYSTEM FOR FACILITATING DISCOVERY AND MANAGEMENT OF FEEDS

RELATED APPLICATION

This application is a continuation of U.S. application Ser. No. 11/966,816, filed Dec. 28, 2007, titled SYSTEM FOR FACILITATING DISCOVERY AND MANAGEMENT OF FEEDS, the disclosure of which is hereby incorporated by reference in its entirety.

BACKGROUND

Description of the Related Technology

Much content on the Internet is updated at a rapid pace. News websites, for instance, often update or add new stories throughout the day. User or organization-generated web logs or blogs can provide frequently-updated content. Additionally, weather data, podcasts, and search results can be updated over time. Users can keep track of these updates by visiting websites frequently. However, web feed technology simplifies the task of keeping track of frequently updated web content.

Example web feeds can include a document having a Really Simple Syndication (RSS), Atom, or other machine-readable format for providing users with updates to web content. In some scenarios of using web feeds, a content provider publishes a feed by providing a Uniform Resource Indicator (URI) on the content provider's website that links to the web feed. Users can subscribe to the feed using an aggregator program, for example, by providing the feed link to the aggregator program. When instructed, the aggregator can ask a corresponding server if the feed has any new content. If new content exists, the aggregator can notify the user of the new content or download all or a portion of the new content to the user's computer.

Users can find web feeds by exploring content providers' websites or by performing searches using general search engines or engines specialized for searching web feeds. Currently available content provider sites and search engines, however, do not necessarily suggest web feeds to users that reflect the users' interests. Consequently, many web feeds that might be interesting to a user can be difficult to find efficiently.

DETAILED DESCRIPTION OF SOME EMBODIMENTS

Figure 1:
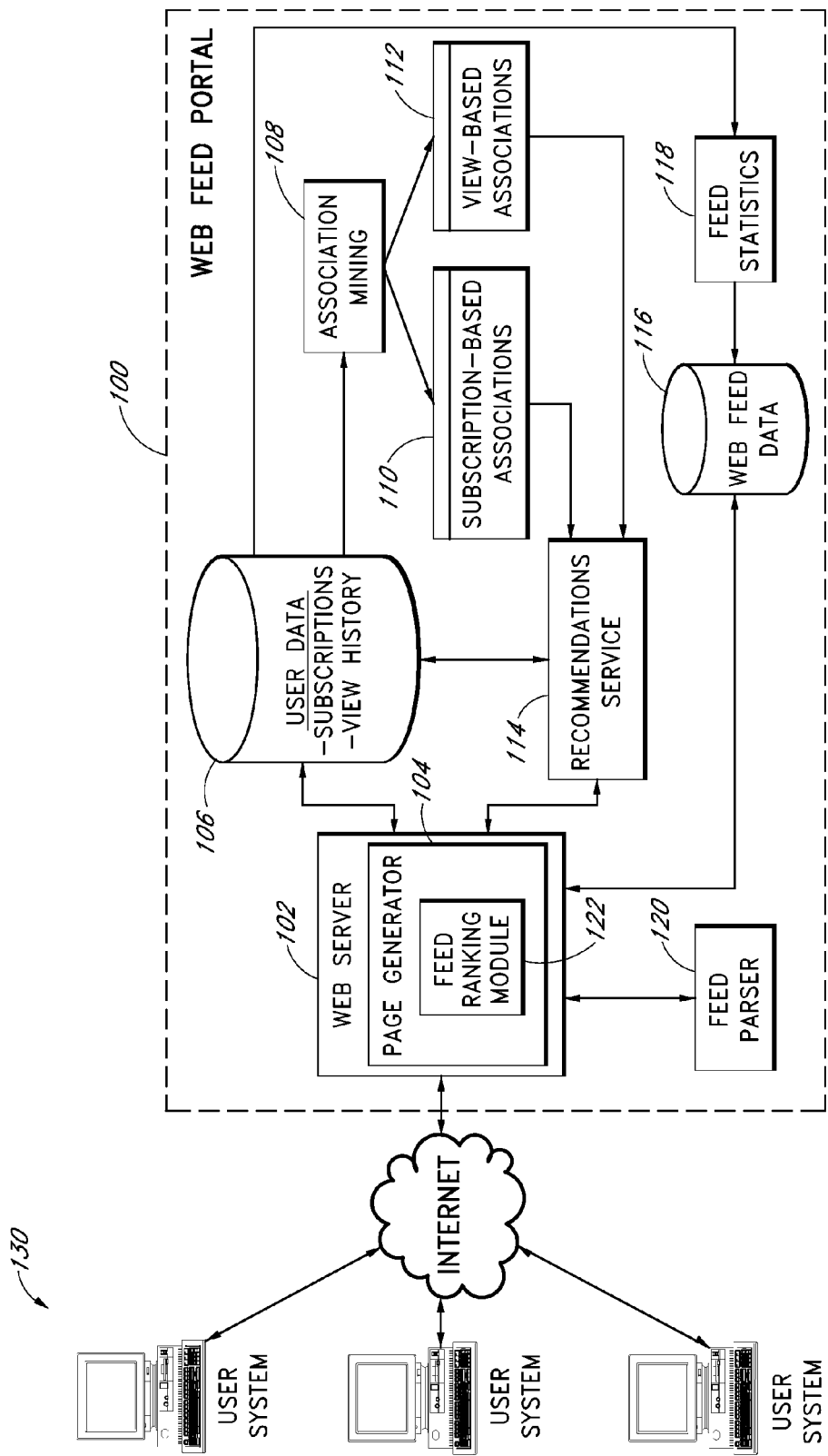
FIG. 1 illustrates a block diagram of a web feed portal in accordance with certain embodiments.

Several different computer-implemented processes will now be described for using recommendation algorithms to recommend items such as web feeds to users. These processes can be embodied individually or in any combination in a multi-user computer system ("system") that implements a recommendation system.

For purposes of illustration, the processes are described primarily in the context of a system that recommends web feeds to users of a website that provides functionality for users to browse and subscribe to feeds. As will be apparent, however, the disclosed processes can also be used in other types of systems and can be used to recommend other types of content items, data streams or periodically updated content to which users can subscribe. In addition, the disclosed processes need not be implemented as part of, or in conjunction with, a website.

As used herein, the term "web feed" is used interchangeably to refer to a document or data format represented by a URI, to a URI itself, to a website upon which the web feed is based, and to any updated content to which the web feed refers. For example, recommending a web feed of a news site to a user can refer to recommending the feed document, the feed URI, the news site, and updated content on the news site. As will be apparent from the context in which it is used, the term is also sometimes used herein to refer only to the web feed document, to a URI, to the website upon which the web feed is based, or only to the updated content to which the web feed refers.

As described above, currently-available methods for finding web feeds of interest to a user suffer serious drawbacks. Search engines, for instance, enable users to search for blogs or other content using web feeds but do not list web feeds that necessarily reflect the user's interests. Some search engines enable a user to browse categories of web feeds. These engines, however, also fail to suggest web feeds to users.

Thus, in certain embodiments, systems and methods are provided for recommending items such as web feeds to users. Recommendations can advantageously be personalized based on the monitored actions of users. For instance, user activity can be analyzed to determine the web feed preferences of users. Additionally, functionality is provided in certain embodiments for users to subscribe to web feeds.

The features of these systems and methods will now be described with reference to the drawings summarized above. Throughout the drawings, reference numbers may be re-used to indicate correspondence between referenced elements. The drawings, associated descriptions, and specific implementation are provided to illustrate embodiments of the inventions described herein and not to limit the scope thereof. In addition, methods and processes described herein are not limited to any particular sequence, and the blocks or states relating thereto can be performed in other sequences that are appropriate. For example, described blocks or states may be performed in an order other than that specifically disclosed, or multiple blocks or states may be combined in a single block or state. Moreover, the various modules of the systems described herein can be implemented as software applications, modules, or components on one or more computers, such as servers. While various modules are illustrated separately, they may share some or all of the same underlying logic or code. Thus, nothing in the following description is intended to imply that any particular feature, characteristic or component of the disclosed system is essential to the various embodiments disclosed herein.

Turning to FIG. 1, an embodiment of a web feed portal 100 is shown that addresses the foregoing problems, among others. The recommendation system 100 advantageously recommends web feeds to users and enables users to subscribe to the recommended web feeds. The recommendation system 100 also advantageously enables users to contribute web feeds to the web feed portal 100, which can in turn be recommended to other users.

By way of overview, the web feed portal 100 shown in FIG. 1 includes a web server 102 or servers that generate and serve pages of a host website in response to page requests from user computer systems 130. The web server 102 provides user access to items such as web feeds, whose addresses can be stored in one or more web feed databases or repositories 116. Users can access the web feeds in certain embodiments by using a web feed user interface generated by the web server 102, an example of which is shown and described below with respect to FIG. 5. The web feed user interface can include one or more web pages that can be downloaded from the web server 102 by a browser or other program installed on a user computer system 130. Alternatively, the web feed user interface can be implemented as an application stored locally on the user computer systems 130. For example, the web feed user interface can be an aggregator, feed reader, plug-in to a browser, or the like.

Advantageously, the web user interface can display personalized web feed recommendations to a target user. For example, the recommended web feeds can be generated by the web feed portal 100 based on data collected about the target user. Using the web feed user interface, the user can select a recommended web feed to view. The user can also subscribe to a recommended web feed. In addition, the user can contribute a web feed to the web feed database 116 using the web feed user interface. In certain embodiments, when a user contributes a new web feed, the web feed portal 100 automatically subscribes the user to the contributed web feed. The web user interface can also beneficially display web feeds to which a user has subscribed.

In more detail, the web server 102 in certain embodiments includes a page generator 104. The page generator 104 is a module that can generate the web page or pages of the web feed user interface. To generate the web feed user interface for a specific user, the page generator 104 retrieves user activity data (if any exists) regarding the user's web feed subscriptions (if available) from a user database 106. Using this user activity data, the page generator 104 can retrieve the subscribed web feeds' addresses from the web feed database 116. In one embodiment, the user database 106 and web feed database 116 are one database. The page generator 104 can also retrieve a list of recommended web feeds from a recommendations service 114, the operation of which is described in further detail below. Using the list of recommended web feeds, the page generator 104 can retrieve the addresses of the recommended web feeds from the web feed database 116.

Once the page generator 104 has the addresses of the subscribed and recommended web feeds, the page generator 104 can retrieve each subscribed and recommended web feed from the remote servers where they are hosted. The page generator 104 retrieves the feeds in one embodiment by using a feed parser 120 such as Magpie RSS™ or the like. The feed parser 120 is a module that can fetch and parse web feed documents. In one embodiment, the feed parser 120 first determines if a feed is valid. If so, it parses the web feed document to obtain information about the feed. For example, the feed parser 120 can obtain the title of the feed, recent feed headlines, a last update time of the feed, feed text, images, a URI of a website hosting the feed, URI's of articles of the feed, the publication time of each article, descriptions of the feed, names of the feed editor and feed webmaster, the language of the feed, combinations of the same, and the like.

Using some or all of the information obtained by the feed parser 120, the page generator 104 can generate the web user interface.

The page generator 104 can also use a feed ranking module 122 to generate a display ranking of the subscribed feeds. In one embodiment, the feed ranking module 122 receives data regarding the last update time for each subscribed feed from the feed parser 120. The feed ranking module 122 can also receive data from the user database 106 regarding the last time the user viewed each subscribed feed, such that the ranking is personalized for this particular user. Using this last update time and/or last viewed time data, the feed ranking module 122 can rank the user's subscriptions. For example, the feed ranking module 122 can list subscriptions with more recent update or viewed times first. More detailed algorithms for ranking web feeds are described below with respect to FIG. 2. In certain embodiments, the feed ranking module 122 can also rank recommended feeds.

The web feed user interface can be used to track users in a variety of ways. In one embodiment, the web feed user interface (or the web server 102) tracks users by assigning an HTTP cookie to the user, which is stored locally on the user's computer 130. The cookie can include, for example, a unique identification of the user or user system 130, with corresponding identification stored in the user database 106. The cookie can also optionally include user preference settings, such as preferred display settings that configure how subscriptions and recommendations are displayed. In alternative embodiments, the web user interface can provide a login prompt instead of, or in addition to, using cookies. Users can log in using indicia such as a user name and/or password to access their web feed subscriptions and recommendations.

Users can subscribe to feeds in at least two ways. First, a user can select a recommended feed by, for example, clicking a control in a user interface encoded for display at the user system 130 by page generator 104. The control could be, among others, a subscribe link, button, or the like. Once the user has selected the recommended feed for subscription, the web feed user interface can send a notification of the subscription to the web server 102. The web server 102 can in turn create a record of the new web feed subscription in the user database 106. In addition, in some embodiments, the web server 102 causes the page generator 104 to regenerate the web feed user interface with the updated subscription information.

Another way for a user to subscribe to a feed is to contribute a feed. As one example, a user can input an address of a web feed into an input area of the web feed user interface, such as a text field or the like. The web feed user interface can then send the address of the contributed feed to the web server 102. The web server 102 in turn can update the subscription data in the user database 106 with the contributed feed. In addition, if the web feed address does not already exist in the web feed database 116, the web server 102 can add the address of the new feed to the web feed database 116. Thus, certain embodiments of the web feed portal 100 beneficially allow users to contribute new feeds to the web feed portal 100.

As described above, web feed recommendations are generated by the recommendations service 114. In certain embodiments, the recommendations service 114 generates some or all of the recommendations at the time a web page of the web feed user interface is generated. The recommendations service 114 can include one or more recommendation engines for generating personalized recommendations, non-personalized recommendations, combinations of the same, and the like. Personalized recommendations can be based at least in part on data about the user and are therefore personalized or targeted to the user's interests. Non-personalized recommendations, on the other hand, may take little or no account of the user data. One example of non-personalized recommendations is the recommendation of web feeds based on their popularity. Another example of non-personalized recommendations includes web feeds that are randomly selected for recommending to a user.

In various implementations, the recommendations service 114 generates personalized recommendations by first retrieving user activity data, including data on user subscriptions and web feed view history, from the user database 106. User subscription data can include a list of web feeds the user is subscribed to. The user subscription data can also include data on web feeds the user has subscribed to in the past but has since unsubscribed from. The user's view history can include a record of web feeds viewed by the user while using the web feed user interface. This view history can also include data on how frequently a user has viewed the web feeds and a last viewed time for each viewed feed. In some instances, the view history can overlap with the subscription history, such that the view history also includes data on subscriptions that the user has viewed, the last viewed time for each subscription, and so forth. In addition, information about the feeds the user has viewed can additionally be obtained from one or more other sources, such as a browser toolbar installed on the user's computer 130.

Once the recommendations service 114 has retrieved the user activity data, the recommendations service 114 can analyze this data to determine the web feed interests of the user. By analyzing the user activity data, which can include actions made by the user during the current browse session, the recommendations service 114 can generate recommendations based on the user's behavior. Thus, the recommendations service 114 can provide recommendations that are targeted or personalized to the user's interests.

One example implementation of this analysis by the recommendations service 114 is as follows. The recommendations service 114 in certain embodiments uses one or more associated items tables or datasets 110, 112 to look up web feeds that are similar to or associated with the web feeds in the user's activity data. The recommendations service 114 can also look up data values in the associated items tables 110, 112 that indicate the strengths of such relationships. These associated items tables 110, 112 can be generated off-line by an association mining module 108 that analyzes the user activity data for a plurality of users. By analyzing this user activity data, the association mining module 108 can detect and quantify or score behavior-based associations between specific web feeds.

More particularly, in certain embodiments the association mining module 108 can analyze the web feed subscriptions of a plurality of users to generate item-to-item mappings between the subscribed web feeds. For instance, web feed A may be mapped to web feed B in a subscription-based associated items table 110 if a relatively large number of users who subscribed to web feed A also subscribed to web feed B. Likewise, view-based associations 112 can be detected and quantified based on the view histories of a plurality of users.

In certain embodiments, the association mining module 108 can use one or more of the association or similarity mining techniques described in U.S. Pat. No. 6,912,505 entitled "Use of Product Viewing Histories of Users to Identify Related Products," issued Jun. 28, 2005, the disclosure of which is hereby incorporated by reference in its entirety. For example, the association mining module 108 can create item-to-item mappings that include complementary associations and substitution associations. Complementary associations include associations between items that complement each other, for example, an association between a web feed that reports news for a locality and a web feed that reviews restaurants in the same locality. Substitution associations include associations between items that can be substituted for each other, for example, an association between different web feeds that discuss politics.

Personalized recommendations can also be made using information unrelated to the user's other web feed activity. For example, web feed recommendation system 100 may be able to determine an IP address of the user system 130 and make guesses about the user's interests by determining whether the IP address is affiliated with a particular geographic, political, or entity affiliation. As an additional example, the time of day of the access, the type of user system (e.g. hardware, software, client information, etc.) could also be used to provide certain guesses about the user's interests. For example, a user system determined to be an Apple® Macintosh® operating system may be provided with feeds related to Apple Macintosh enthusiasts.

In addition to providing personalized or behavior-based recommendations, the recommendations service 114 can provide non-personalized recommendations. Non-personalized recommendations can be useful for first-time users of the web feed user interface or for users who have little or no view history or subscriptions. In addition, non-personalized recommendations can be used for all users in certain embodiments. Moreover, the number of non-personalized recommendations provided to a user can decrease as the user's activity data grows. A user with little user activity data might, for instance, receive many non-personalized recommendations and few personalized recommendations. Conversely, a user with a significant amount of user activity data might receive mostly or all personalized recommendations.

Non-personalized recommendations can include recommendations generated based on the popularity of web feeds. For example, in one embodiment a most popular set of web feeds are provided to the user as recommendations. The popularity of the web feeds can be determined based on how many users have viewed the web feeds and/or how many users have subscribed to the web feeds. Popularity can also be based at least in part on the number of times a web feed has been contributed by the user community. In certain embodiments, web feed popularity is determined by a feed statistics module 118. Whenever a user views or subscribes to a web feed, data regarding the feed subscribed to or viewed can be passed to the feed statistics module 118, which can increment a popularity count for each web feed viewed or subscribed to. The feed statistics module 118 can pass this popularity data to the web feed database 116.

Non-personalized recommendations can also include web feeds that are randomly selected to recommend to a user. Providing randomly-selected web feeds as recommendations beneficially allows recommendations that have been contributed by the user community to be recommended to users. This is so because in some implementations newly-contributed web feeds have little or no popularity data, and hence may not be recommended according to popularity criteria. Thus, randomly selecting from these contributed feeds enables the contributed feeds to gain exposure and popularity ranking.

All or a subset of the recommendations generated by the recommendations service 114 can be provided to the user. For example, a most highly-scored subset of the recommendations can be provided. This subset can include highly-scored personalized recommendations, scored based on degree of association, and highly-scored non-personalized recommendations, scored based on degree of popularity. Because the scoring scales for degrees of association and degrees of popularity can differ, normalization techniques can be used to compare the scores of the personalized and non-personalized recommendations. In certain embodiments, example normalization techniques can be used that are disclosed in U.S. patent application Ser. No. 11/772,010, entitled "Recommendation System With Multiple Integrated Recommenders," filed Jun. 29, 2007, the disclosure of which is hereby incorporated by reference in its entirety.

In one implementation, a mix of personalized and non-personalized recommendations are selected for recommendation to the user. One example scenario of selecting recommendations includes selecting ten most popular feeds, selecting five additional randomly-selected feeds shuffled among the ten popular feeds, and selecting behavior-based recommendations to be provided at the top of the list of recommendations, sorted by recommendation strength. Many other mixes of recommendations can be provided.

Other types of recommendation engines, including recommendation engines that do not use item-to-item mappings, may also be used by the recommendations service 114 to generate recommendations, alone or in combination with the techniques described herein. For example, recommendation engines can be provided that generate popularity recommendations based on 1 to 5 star rankings of web feeds, using the techniques described in U.S. Pat. No. 7,310,612, entitled "Personalized Selection and Display of User-Supplied Content to Enhance Browsing of Electronic Catalogs," issued Dec. 18, 2007, the disclosure of which is hereby incorporated by reference in its entirety. Also, recommendation engines that vary the recommendations provided over time can also be used by the recommendation service 114, examples of which are disclosed in U.S. application Ser. No. 11/752,251, entitled "Probabilistic Recommendation System," filed May 22, 2007, the disclosure of which is hereby incorporated by reference in its entirety. Other recommendation engines can also be used.

Although the above embodiments describe numerous feed-related tasks as being performed by the web server 102, in certain embodiments some or all of these tasks can be performed by one or more separate services or applications that communicate with the web server over a network or other communications medium. For example, in some embodiments, such tasks may be implemented as a web service that is accessible by the user system 130 or by the web server 102. Moreover, while the above embodiments describe a web server 102 that can be accessed directly by user computer systems 130 (e.g., through an Internet Service Provider), other embodiments contemplate that a remote website can access the web server 102. For example, in certain embodiments a remote website can generate at least a portion of the web feed user interface for end users of the remote website.

This remote website can use Application Programming Interface (API) calls to retrieve recommendations from the web feed portal 100 to provide to the end users. For example, using one or more API calls, the remote website can provide identification information about a target user to the web feed portal 100 and can request recommendations for the target user from the web portal 100. The remote website can alternatively provide widget code embedded in the web feed user interface, such as JavaScript code or the like, that requests recommendations of the web server 102 directly from the user computer systems 130. In addition, the remote server can provide a plug-in for the user system 130 that includes code for requesting recommendations of the web server 102. In certain embodiments, the remote server can be implemented using some or all of the techniques described in U.S. application Ser. No. 11/694,758, entitled "Service for Providing Item Recommendations," filed Mar. 30, 2007, the disclosure of which is hereby incorporated by reference in its entirety.

Figure 2:
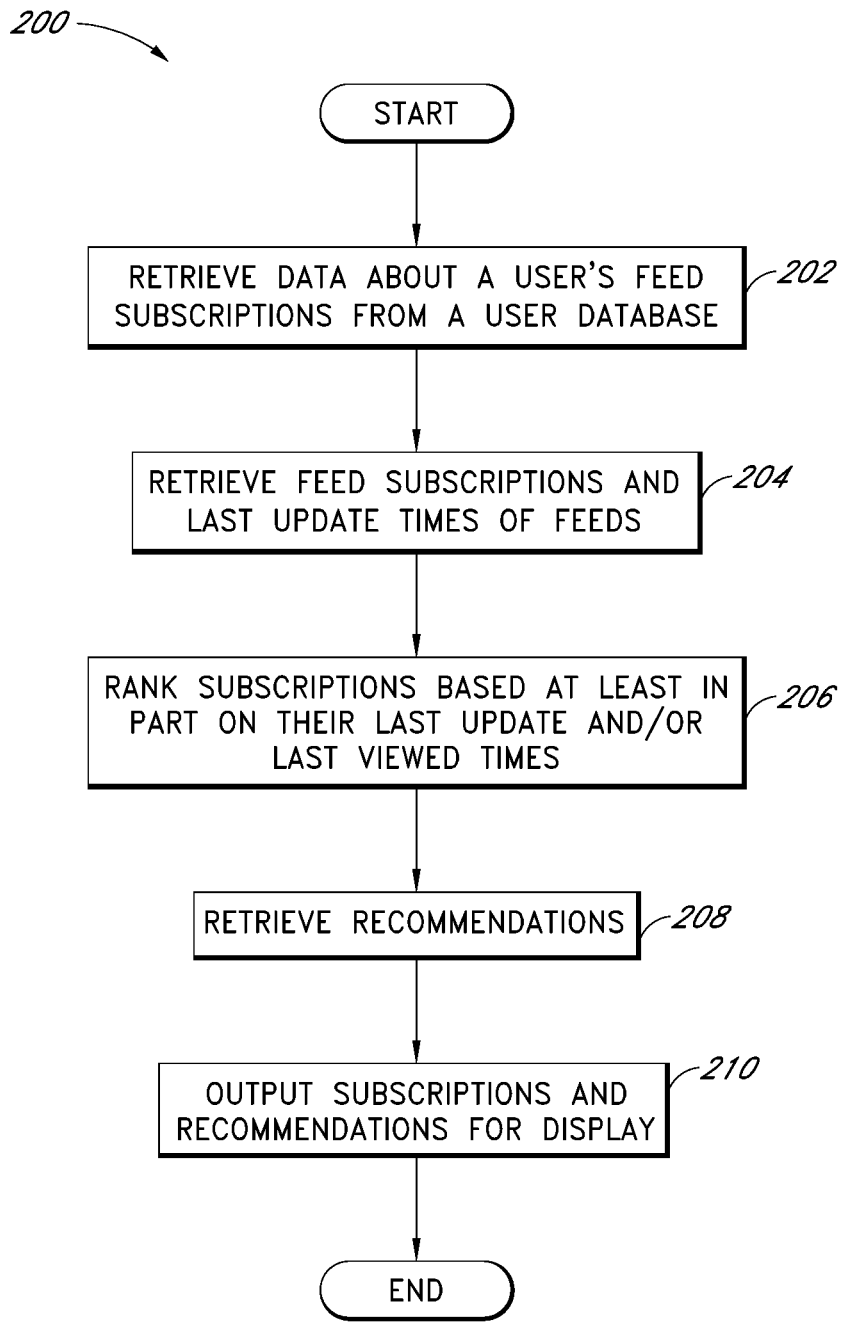
FIG. 2 illustrates a flow chart diagram of an example process for providing web feed subscriptions and recommendations to a user using the web feed portal of FIG. 1.

FIG. 2 illustrates an embodiment of a process 200 for providing web feed subscriptions and recommendations to a user. In certain embodiments, the process 200 may be implemented by the web feed portal 100 or by components thereof. In particular, the process 200 can be implemented by the web server 102 in certain implementations. The process 200 can be invoked in one embodiment by a user upon requesting a web page from a web server, such as the web server 102. In certain embodiments, the process 200 therefore illustrates actions taken by a web server, a service, combinations of the same, or the like when generating a web feed user interface for a user.

At block 202, data about a user's feed subscriptions is retrieved from a user database. This data can include identification data of feeds that the user is subscribed to. The identification data can include, for instance, numerical identifiers that correspond to feed addresses stored in a web feed repository. In addition, this data can include last viewed times of each feed the user is subscribed to.

Using the identification data, at block 204 the feed subscriptions are retrieved. This block 204 can include retrieving addresses of the web feeds from a web feed repository. Using a feed parser or the like, web feed documents can be retrieved from remote websites that host the feeds. The feeds, once retrieved, can be parsed. This block 204 can also include obtaining last update times of each feed by using the feed parser.

The subscriptions can be ranked (e.g., for display according to the rank) at block 206 based at least in part on their last update and/or last viewed times. For example, the feeds can be ranked such that subscriptions with more recent update or viewed times are ranked higher. More specifically, in certain embodiments the feeds are ranked using an exponential decay algorithm. In this algorithm, the subscriptions are given scores that decay exponentially corresponding to the subscriptions' last update and/or last viewed times. When both last update time and last viewed time are used to decay the scores, the algorithm can be referred to as a dual exponential decay algorithm.

Expressions used in one example implementation of the exponential decay algorithm or algorithms can include:

$$V_s = e^{-\lambda \cdot (\text{seconds since last viewed})} \quad (1)$$

$$U_s = e^{-\lambda \cdot (\text{seconds since last updated})} \quad (2)$$

$$\lambda = \frac{\ln(2)}{\alpha}, \quad (3)$$

where $V_s$ represents a last viewed score for a web feed, $U_s$ represents a last updated score for a web feed, $\lambda$ represents a half-life constant having a value greater than 0, ln represents the natural logarithm, $\alpha$ represents a constant, and e represents a mathematical constant. Expression (1) illustrates that in certain embodiments, as the time in seconds since a feed has been viewed increases, its last viewed score $V_s$ decreases exponentially. Similarly, expression (2) illustrates that in certain embodiments, as the time in seconds since a feed was last updated increases, its last updated score $U_s$ decreases exponentially.

In certain embodiments, the half-life constant $\lambda$ represents the half life of the decay functions represented in expressions (1) and (2). The value of $\lambda$ depends on the value of the constant α. In one embodiment, α has a value equivalent to 24*3600, representing (24 hours)*(3600 seconds), or the number of seconds in one day. With this value of α, the half-life constant λ causes the exponential decay functions in expressions (1) and (2) to have a half-life of one day. As a result, the updating and viewing activity within a 24-hour period is effectively weighted more heavily than the updating and viewing activity after a 24-hour period. The value of λ chosen can be varied in certain embodiments to increase or decrease the half-life of the decay. In addition, each of the expressions (1) and (2) can have different values for α and λ in certain implementations.

An overall score for each web feed subscription can be generated in one embodiment by summing the scores $V_s$ and $U_s$. Alternatively, the scores $V_s$ and $U_s$ can be weighted differently, or only one of the two scores $V_s$ and $U_s$ might be used.

Continuing, at block 208 the recommendations are retrieved. The recommendations can be retrieved from a recommendations service, using the techniques described above with respect to FIG. 1 and further described below with respect to FIG. 4. Thereafter, the subscriptions and recommendations are output for display at block 210 by, for example, generating a web feed user interface. In some embodiments the recommended feeds need not be displayed for the user. For instance, the feeds could be stored for use by other user applications on the user system 130 and/or transmitted to other remote systems for various purposes. As one example, a user could obtain web feed recommendations from the web feed portal 100 and publish a web feed of the user's recommendations.

Figure 3:
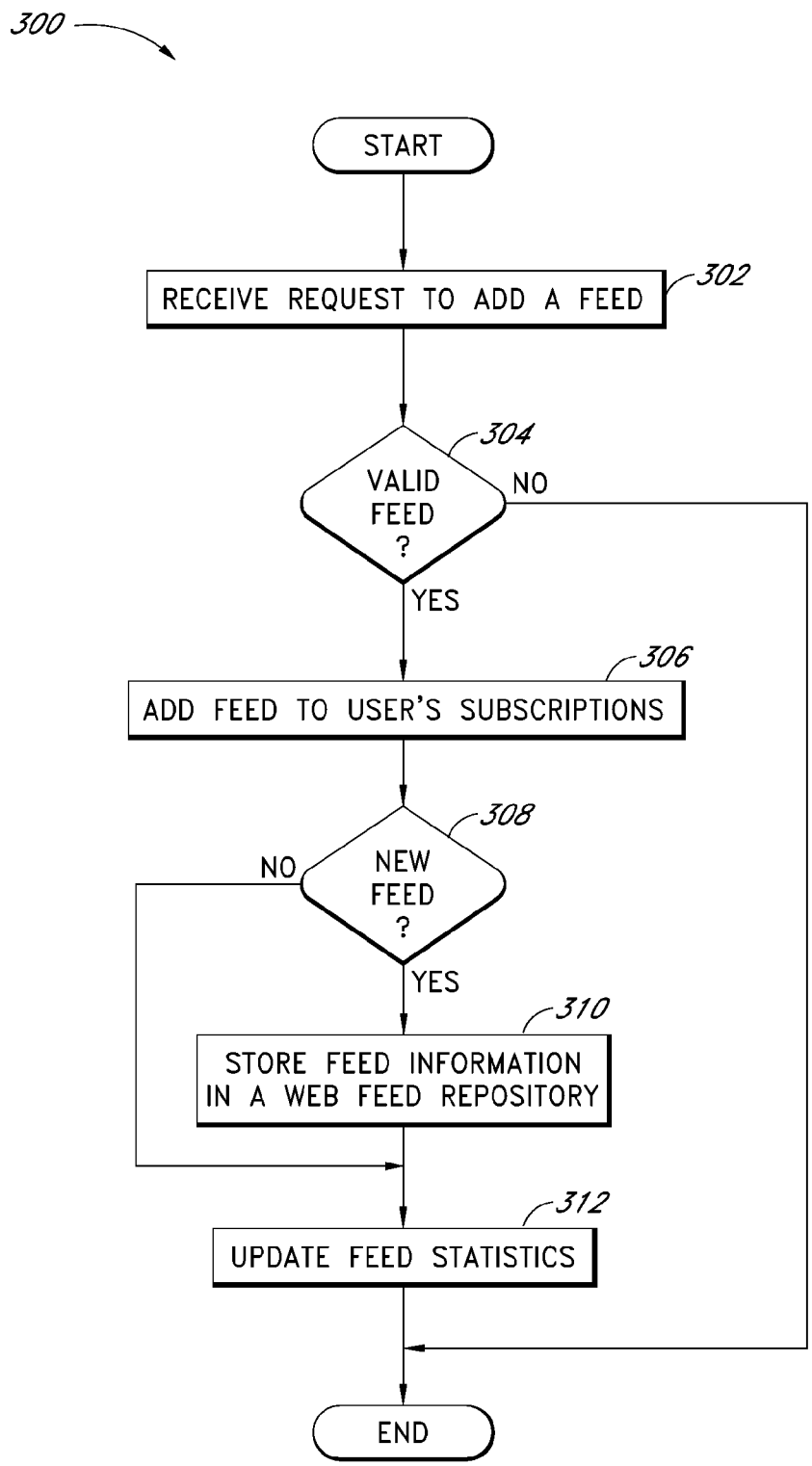
FIG. 3 illustrates a flow chart diagram of an example process for subscribing to web feeds using the web feed portal of FIG. 1.

FIG. 3 illustrates an embodiment of a process 300 for subscribing to web feeds. In certain embodiments, the process 300 may be implemented by the web feed portal 100 or by components thereof. In particular, the process 300 can be implemented by a web server such as the web server 102, a web service, combinations of the same, or the like. Advantageously, the process 300 of certain embodiments facilitates users contributing feeds to a web feed repository.

At block 302, a request is received to add a feed. This request can originate from a user submitting a feed address to a web server using, for example, a web feed user interface or aggregator application. It is determined at block 304 whether the feed is valid. A feed parser or the like can be used to determine whether a valid feed exists, as described above.

If the feed is not valid, the process 300 ends. However, if the feed is valid, the feed is added to the user's subscriptions at 306. This block 306 can include storing a identifier for the feed in a user database. At block 308, it is further determined whether the feed is a new feed, for example, by determining whether the feed has an address or identifier stored in a web feed data repository. This block 308 can include normalizing the addresses of the feeds to facilitate searching for existing feeds by, for example, stripping http, www, or other prefixes, removing trailing slashes, combinations of the same, and the like. If not, at block 310 an address for the feed and optionally an identifier, corresponding to the identifier stored in the user database, is stored in the web feed data repository.

Feed statistics are updated at block 308. Feed statistics can include a count of the number of times a feed has been subscribed to, viewed, or both. In addition, feed statistics can include the last viewed time of the feed by the user. Advantageously, the feed statistics can be used to determine the popularity of feeds. As described above, the popularity of the feeds can be used to create and/or rank feed recommendations.

Figure 4:
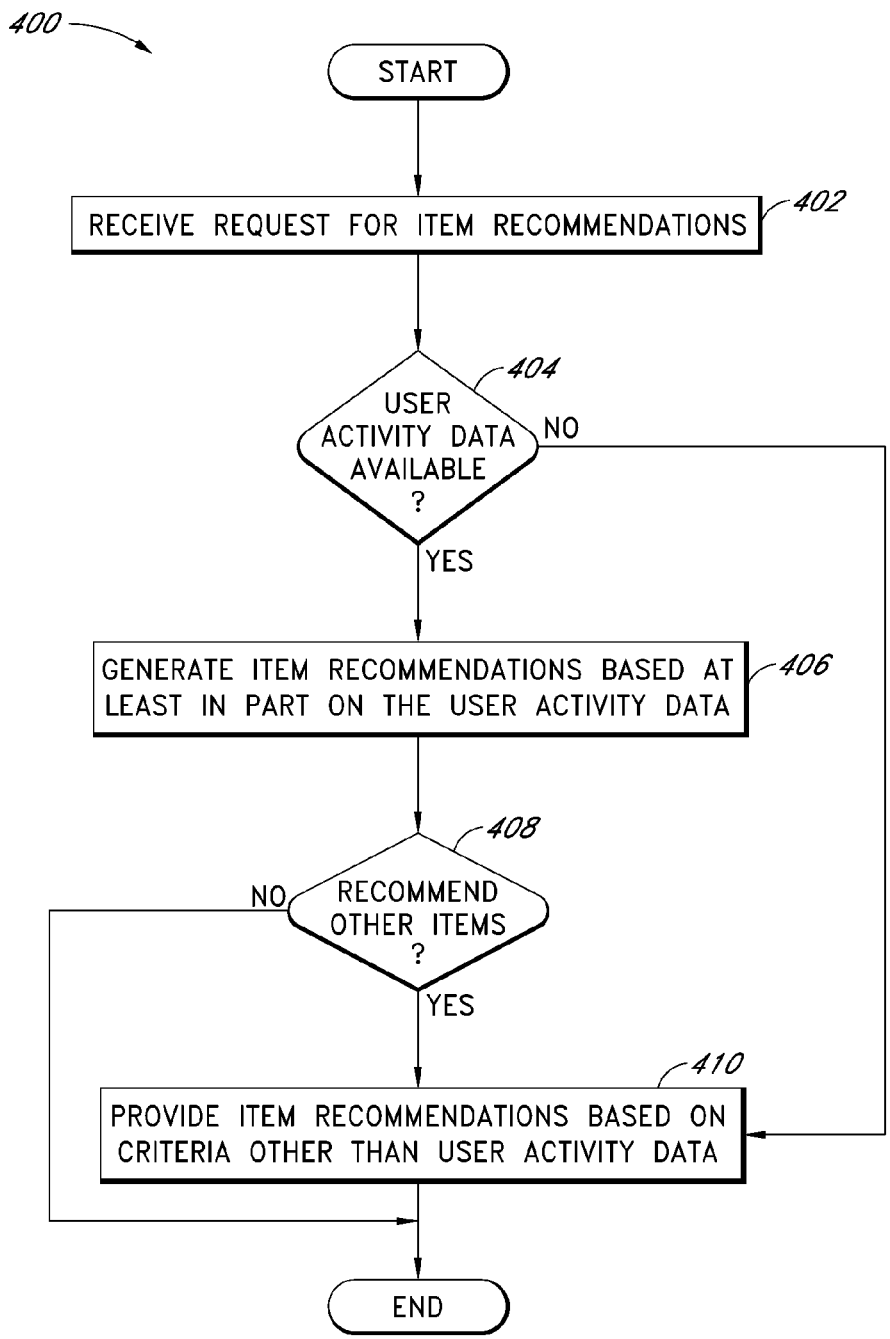
FIG. 4 illustrates a flow chart diagram of an example process for providing item recommendations to a user using the web feed portal of FIG. 1.

FIG. 4 illustrates an embodiment of a process 400 for providing item recommendations. In certain embodiments, the process 400 may be implemented by a recommendation system, such as by the web feed portal 100 or by components thereof. For example, the process 400 can be implemented by a web server such as the web server 102, a web service, combinations of the same, and the like. Advantageously, the process 400 of certain embodiments facilitates providing personalized and/or non-personalized recommendations to users.

A request for item recommendations is received at block 402. This request can be received from a web server by a recommendations service. In addition, in some embodiments this request can be received from a remote website via an API call or the like.

At block 404, it is determined whether user activity data is available. User activity data can include subscription and view history data. If user activity data is available, item recommendations are generated at block 406 based at least in part on the user activity data. These behavior-based recommendations may be generated based at least in part on item-to-item associations, as described above with respect to FIG. 1.

At block 408, it is determined whether to recommend other items. If yes, then at block 410 item recommendations are provided based on criteria other than user activity data. For example, non-personalized recommendations can be provided based on the popularity of the recommended web feeds. Additionally, if user activity data is determined to not be available at block 404, item recommendations are provided based on criteria other than user activity data at block 410. Thereafter, the process 400 ends.

Figure 5:
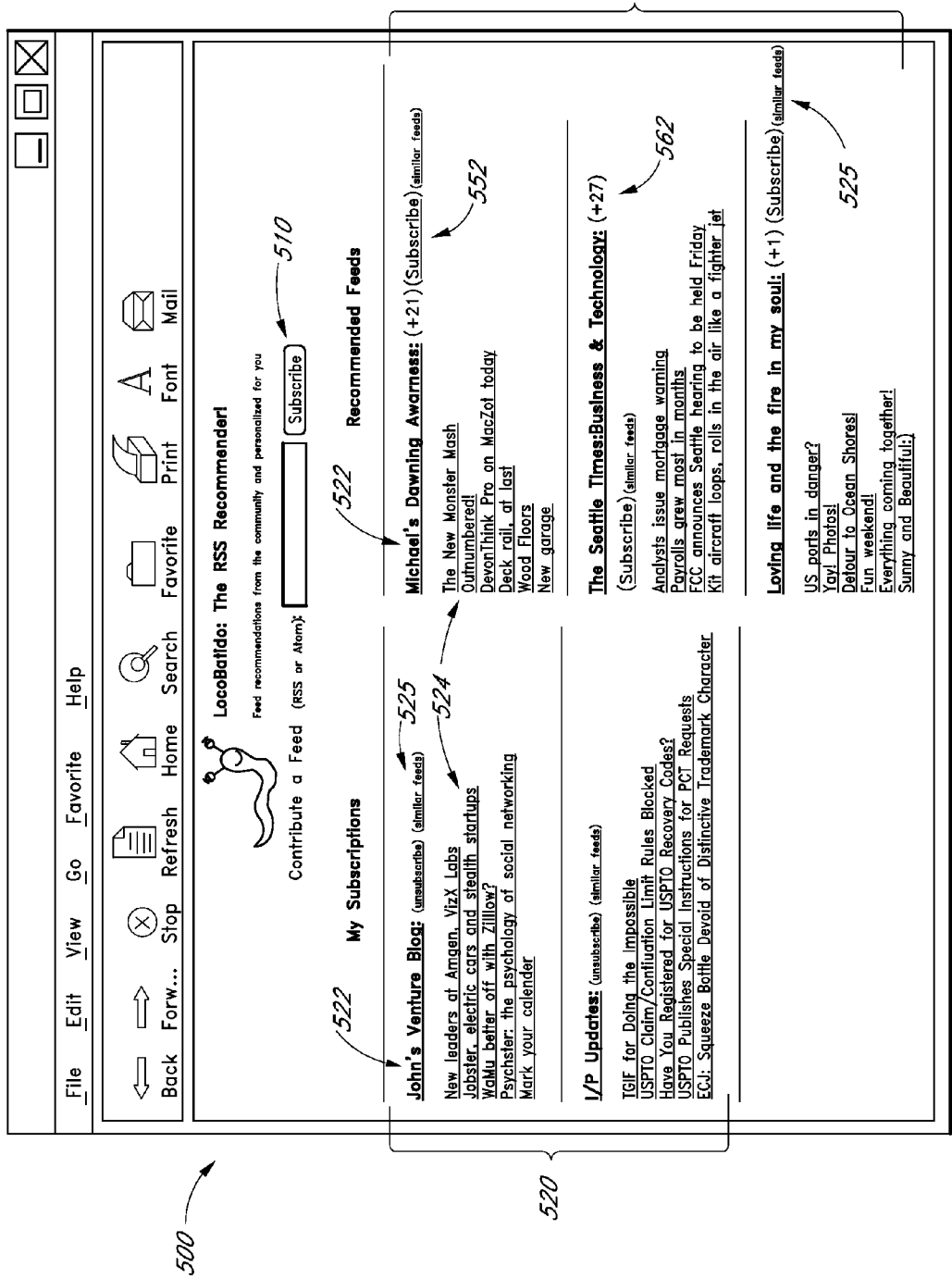
FIG. 5 illustrates an example web feed user interface generated by the web feed portal of FIG. 1.

FIG. 5 illustrates an example web feed user interface 500 for displaying web feed subscriptions and recommendations to a user. In the depicted embodiment, the web feed user interface is illustrated as a web page generated for a particular user. This web page is illustrative only, and other types of user interfaces can be used. For example, an aggregator or feed reader interface could be used to display the feed subscriptions and recommendations.

Subscriptions 520 are listed in the depicted embodiment on the left hand side of the web feed user interface 500. Each web feed is identified by its title 522 (e.g., "John's Venture Blog"). Headlines 524 are also listed for each feed. In certain embodiments, a limited number of the most recent headlines 524 for each feed are displayed. Selecting a title 522 or headline 524 enables a user to view the respective title 522 or headline 524. In addition, when a user selects a title 522 or headline 524, the last view time for that feed can be updated for that user.

Recommended feeds 530 are displayed in the depicted embodiment on the right hand side of the web feed user interface 500. Like the subscriptions 520, the recommended feeds 530 each include a title 522 and headlines 524. Additionally, each recommended feed 530 in the depicted embodiment is shown associated with a subscribe control 552, which in the depicted embodiment includes a "subscribe" hyperlink. The subscribe control 552, when selected, subscribes a user to the selected feed. A popularity counter 562 shows how many users have subscribed to each recommended feed 530. Once a user subscribes to a web feed, the subscribe control 552 link can change to an "unsubscribe" link. When clicked, the unsubscribe link can both remove the user's subscription and decrement the popularity counter 562.

A similar feeds control 525 is displayed next to each subscribed 520 and recommended feed 530. This control 525, when selected, can provide recommendations that are similar to the respective feed 520, 530. A message can accompany the recommendations, which says, as one example, "Users who viewed this feed also viewed," which can be followed by a list of recommendations. These recommendations can include view-based and/or subscription-based recommendations and can be based, for example, on the item-to-item associations described above with respect to FIG. 1.

Contribution controls 510, including a button and input box, are provided for contributing a feed. A user can, for example, enter a feed address in the input box of the contribution controls 510 and subscribe to the feed by pressing the "subscribe" button of the control 510. In other embodiments (not shown), a user can drag a web feed address to an input area to subscribe to the feed or use some other mechanism to contribute a feed.

The display ranking of the subscriptions 520 can be determined, for example, by the process 300 described above. The display ranking of the recommendations 530 is determined in one embodiment by the popularity of the feed, including those feeds that are personalized recommendations 530. The display ranking of the recommendations 530 can also be based on the last update time of the feeds 530. In addition, personalized recommendations 530 can be displayed before non-personalized recommendations 530 in one embodiment.

In another embodiment, the recommended feeds 530 are displayed in order of their fetch time. For example, an Asynchronous JavaScript and XML (AJAX) asynchronous programming technique can be used to populate the recommended feeds 530 in order of which feeds are fetched by a feed parser. Thus, in these embodiments, feeds 530 that load relatively quickly are displayed earlier, while feeds that take longer to load are displayed later. This asynchronous programming technique can also be used for displaying subscriptions in certain embodiments.

In certain embodiments, other enhancements can be provided to the web feed user interface 500. For example, a "not interested" control can be provided for each recommended web feed. Selecting the "not interested control" could prevent the corresponding recommended web feed from being presented to the user again. As another example, reasons can be provided for each recommendation, such as "recommended because you viewed web feeds related to computers." The relative weight, score, or the like of each recommendation can also be shown. One or more of the recommendations can also display a list of the user's friends who have subscribed to or viewed the particular recommended feed. In one implementation, the user can view feeds contributed by, subscribed to, or viewed by the user's friends or by other users.

Advantageously, in certain embodiments advertisements can be embedded in the web feed user interface to enable a provider of the web feed user interface to be compensated. For example, the advertisements may be pay-per-click or pay-per-impression advertisements that compensate one or more of the website operator or the web feed recommendation system operator. In some instances, the web feed recommendation system could be implemented as a service for use by websites. In such an environment, the website may compensate the web feed recommendation system by compensating using, for example, a pay-per-use scheme (e.g. metering) or a subscription plan. According to some embodiments, the provider of the web feeds themselves may compensate one or more of the website operator or the web feed recommendation system operator based on the number of click-throughs to the web feed web page, for each subscription generated, or other metrics.

Moreover, the advertisements can be targeted to the user's viewing and subscription activity. For example, advertisements can be shown for political books if the user has viewed or subscribed to political web feeds. Advertisements can also be shown along with an explanation such as "customers who viewed (or subscribed to) these web feeds bought these products." Similarly, advertisements for can be shown along with any of the following explanations: "customers who viewed (or subscribed to) these web feeds (a) bought in this category of products, (b) bought products tagged with keywords found in these web feeds, (c) bought products with item descriptions similar to the text of the web feeds you read," combinations of the same, and the like.

Each of the processes, components, and algorithms described above may be embodied in, and fully automated by, code modules executed by one or more computers or computer processors. The code modules may be stored on any type of computer-readable medium or computer storage device. The processes and algorithms may also be implemented partially or wholly in application-specific circuitry. The results of the disclosed processes and process steps may be stored, persistently or otherwise, in any type of computer storage. In one embodiment, the code modules may advantageously be configured to execute on one or more processors. In addition, the code modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, variables, or the like.

The various features and processes described above may be used independently of one another, or may be combined in various ways. All possible combinations and subcombinations are intended to fall within the scope of this disclosure. In addition, certain method or process steps may be omitted in some implementations.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A system for providing personalized web feed recommendations to users, the system comprising:
   a user data store comprising first user interest data associated with a first user and second user interest data associated with a second user;
   a web feed data store comprising web feed content;
   a recommendations system comprising computer hardware, the recommendations system configured to generate first personalized web feed recommendations for the first user based at least in part on the first user interest data, the first personalized web feed recommendations comprising at least a portion of the web feed content stored in the web feed data store; and
   a page generator configured to output a first web feed user interface comprising the first personalized web feed recommendations for presentation to the first user, the first web feed user interface comprising functionality for the first user to submit new web feed content to the web feed data store, wherein the new web feed content was not previously contained in the web feed data store;

wherein the recommendations system is further configured to generate second personalized web feed recommendations for the second user including the new web feed content submitted by the first user based at least in part on the second user interest data and a behavioral association detected between the user-submitted new web feed content and at least one subscribed-to web feed of the second user, and to identify users who have subscribed to the user-submitted new web feed content;

wherein the page generator is further configured to output a second web feed user interface for presentation to the second user, the second web feed user interface comprising the second personalized web feed recommendations and a list of a subset of the users who have subscribed to the new web feed content, thereby enabling the second user to subscribe to the new web feed content;

wherein the subset of the users who have subscribed to the user-submitted new web feed content includes users indicated by the second user interest data as friends of the second user; and wherein the behavioral association detected between the user-submitted new web feed content and the at least one subscribed-to web feed of the second user indicates that at least one user subscribed to both the user-submitted new web feed content and the at least one subscribed-to web feed of the second user.

2. The system of claim 1, wherein the first web feed user interface comprises functionality for the first user to subscribe to selected web feed content of the personalized web feed recommendations by selecting the selected web feed content.

3. The system of claim 1, wherein the first web feed user interface further comprises web feed content to which the first user is subscribed, wherein the subscribed web feed content is ranked, at least in part, on the following information: duration since the web feed content was last updated.

4. The system of claim 1, wherein the recommendations system is configured to generate the first personalized web feed recommendations based, at least in part, on data regarding web feed content popularity.

5. The system of claim 1, wherein the first personalized web feed recommendations are, at least in part, randomly selected for recommendation to the first user.

6. The system of claim 1, wherein the new web feed content submitted by the first user is submitted to the web feed data store only after determining that the new web feed content is not already contained in the web feed data store.

7. A computer-implemented method of recommending feeds to users, the method comprising:

by a computer system comprising one or more processors:

providing a user data store comprising first user interest data associated with a first user and second user interest data associated with a second user;

providing a web feed data store comprising web feed content;

generating first personalized web feed recommendations for the first user based at least in part on the first user interest data, the first personalized web feed recommendations comprising at least a portion of the web feed content stored in the web feed data store;

generating a first web feed user interface comprising the first personalized web feed recommendations for presentation to the first user, the first web feed user interface comprising functionality for the first user to submit new web feed content to the web feed data store, wherein the new web feed content was not previously contained in the web feed data store;

detecting a behavioral association between the user-submitted new web feed content and at least one subscribed-to web feed of the second user, wherein the behavioral association indicates that at least one user subscribed to both the user-submitted new web feed content and the at least one subscribed-to web feed of the second user;

generating second personal web feed recommendations for the second user including the new web feed content submitted by the first user based at least in part on the second user interest data and the detected behavioral association;

identifying users who have subscribed to the user-submitted new web feed content; and generating a second web feed user interface for presentation to the second user, the second web feed user interface comprising the second personalized web feed recommendations and a list of a subset of the users who have subscribed to the new web feed content, thereby enabling the second user to subscribe to the new web feed content;

wherein the subset of the users who have subscribed to the user-submitted new web feed content includes users indicated by the second user interest data as friends of the second user.

8. The method of claim 7, wherein the first web feed user interface comprises functionality for the first user to subscribe to selected web feed content of the first personalized web feed recommendations by selecting the selected web feed content.

9. The method of claim 7, wherein generating the first web feed user interface comprises ranking web feed content to which the first user is subscribed based at least in part on the following information about the subscribed-to web feed content: duration since the web feed content was last updated.

10. The method of claim 7, wherein the first personalized web feed recommendations are generated based at least in part on data regarding web feed content popularity.

11. The method of claim 7, wherein the first personalized web feed recommendations are, at least in part, randomly selected for recommendation to the first user.

12. The method of claim 7, wherein the new web feed content submitted by the first user is submitted to the web feed data store only after determining that the new web feed content is not already contained in the web feed data store.

13. Non-transitory physical computer storage comprising instructions stored thereon for implementing, in one or more processors, a method of recommending feeds to users, the method comprising:

providing a user data store comprising first user interest data associated with a first user and second user interest data associated with a second user;

providing a web feed data store comprising web feed content;

generating first personalized web feed recommendations for the first user based at least in part on the first user interest data, the first personalized web feed recommendations comprising at least a portion of the web feed content stored in the feed data store;

generating a first web feed user interface comprising the first personalized web feed recommendations for presentation to the first user, the web feed user interface comprising functionality for the first user to submit new web feed content to the web feed data store, wherein the new web feed content was not previously contained in the web feed data store;

detecting a behavioral association between the new web feed content and at least one subscribed-to web feed of the second user, wherein the behavioral association indicates that at least one user subscribed to both the user-submitted new web feed content and the at least one subscribed-to web feed of the second user;

generating second personal web feed recommendations for the second user including the new web feed content submitted by the first user based at least in part on the second user interest data and the detected behavioral association;

identifying users who have subscribed to the user-submitted new web feed content; and generating a second web feed user interface for presentation to the second user, the second web feed user interface comprising the second personalized web feed recommendations and a list of a subset of the users who have subscribed to the new web feed content, thereby enabling the second user to subscribe to the new web feed content;

wherein the subset of the users who have subscribed to the new web feed content includes users indicated by the second user interest data as friends of the second user.

14. The non-transitory physical computer storage of claim 13, wherein the first web feed user interface comprises functionality for the first user to subscribe to selected web feed content of the first personalized web feed recommendations by selecting the selected web feed content.

15. The non-transitory physical computer storage of claim 13, wherein generating the first web feed user interface comprises ranking web feed content to which the first user is subscribed based at least in part on the following information about the subscribed-to web feed content: duration since the subscribed-to web feed content was last updated.

16. The non-transitory physical computer storage of claim 13, wherein the first personalized web feed recommendations are generated based at least in part on data regarding web feed content popularity.

17. The non-transitory physical computer storage of claim 13, wherein the first personalized web feed recommendations are, at least in part, randomly selected for recommendation to the first user.

18. The non-transitory physical computer storage of claim 13, wherein the new web feed content submitted by the first user is submitted to the web feed data store only after determining that the new web feed content is not already contained in the web feed data store.

* * * * *